(12) United States Patent
Bober et al.

(10) Patent No.: US 9,864,928 B2
(45) Date of Patent: Jan. 9, 2018

(54) COMPACT AND ROBUST SIGNATURE FOR LARGE SCALE VISUAL SEARCH, RETRIEVAL AND CLASSIFICATION

(71) Applicant: University of Surrey, Guildford (GB)

(72) Inventors: Miroslaw Bober, Guildford (GB); Syed Husain, Guildford (GB)

(73) Assignee: VISUAL ATOMS LTD, Woking, Surrey (GB)

( * ) Notice: Subject to any disclaimer, the term of this patent is extended or adjusted under 35 U.S.C. 154(b) by 0 days.

(21) Appl. No.: 14/903,590

(22) PCT Filed: Jul. 7, 2014

(86) PCT No.: PCT/GB2014/052058
§ 371 (c)(1),
(2) Date: Jan. 7, 2016

(87) PCT Pub. No.: WO2015/004434
PCT Pub. Date: Jan. 15, 2015

(65) Prior Publication Data
US 2016/0267351 A1 Sep. 15, 2016

(30) Foreign Application Priority Data

Jul. 8, 2013 (GB) .................................. 1312213.0

(51) Int. Cl.
*G06K 9/46* (2006.01)
*G06K 9/62* (2006.01)
(Continued)

(52) U.S. Cl.
CPC ......... *G06K 9/6202* (2013.01); *G06K 9/4671* (2013.01); *G06K 9/6272* (2013.01); *H04N 19/90* (2014.11); *H04N 19/94* (2014.11)

(58) Field of Classification Search
CPC .. G06K 9/4671; G06K 9/6202; G06K 9/6272; H04N 19/90; H04N 19/94
See application file for complete search history.

(56) References Cited

U.S. PATENT DOCUMENTS 8,054,170 B1 * 11/2011 Brandt ................. G06K 9/4676
340/453
8,447,107 B1 * 5/2013 Dhua ................... G06K 9/4604
382/170

(Continued)

FOREIGN PATENT DOCUMENTS

EP 2405392 A1 1/2012

OTHER PUBLICATIONS

Jegou H. et al.; "Aggregating Local Image Descriptors into Compact Codes"; IEEE Transactions on Pattern Analysis and Machine Intelligence, IEEE Computer Society, US; vol. 34, No. 9; Sep. 1, 2012; pp. 1704-1716.

(Continued)

*Primary Examiner* — Phuoc Tran
(74) *Attorney, Agent, or Firm* — Fisherbroyles, LLP; Micah D. Stolowitz (57) ABSTRACT

A method for deriving a representation of an image, by processing signals corresponding to the image, comprises identifying a plurality of feature points in the image, deriving feature descriptors of feature points, and assigning feature descriptors to pre-defined center points, wherein each feature descriptor is assigned to a plurality of center points, the method further comprising, for each center point, calculating the difference between each feature descriptor assigned to said center point, deriving a value descriptor for each center point from said calculated differences, and deriving the representation from said value descriptors for said center points.

25 Claims, 6 Drawing Sheets

(51) Int. Cl.
H04N 19/90 (2014.01)
H04N 19/94 (2014.01)

(56) References Cited

U.S. PATENT DOCUMENTS

2011/0255781 A1* 10/2011 Hamsici ............... G06K 9/4671
382/170
2011/0299770 A1* 12/2011 Vaddadi ............... G06K 9/6211
382/165
2012/0109993 A1* 5/2012 Reznik ................. G06K 9/4671
707/765

OTHER PUBLICATIONS

Philbin J. et al.; "Lost in Quantization: Improving Particular Object Retrieval in Large Scale Image Databases"; Computer Vision and Pattern Recognition, 2008. cvpr 2008; IEEE Conference on IEEE; Piscataway, NJ, US; Jun. 23, 2008; pp. 1-8.

Spyromitros-Xioufis E. et al.; "An Empirical Study on the Combination of Surf Features with VLAD Vectors for Image Search"; Image Analysis for Multimedia Interactive Services (WIAMIS), 2012 13th International Workshop IEEE; May 23, 2012; pp. 1-4.

Lowe David G.; "Distinctive Image Features from Scale-Invarient Keypoints"; International Journal of Computer Vision, Kluwer Academic Publishers, BO, vol. 60, No. 2; Nov. 1, 2004; pp. 91-110.

* cited by examiner

COMPACT AND ROBUST SIGNATURE FOR LARGE SCALE VISUAL SEARCH, RETRIEVAL AND CLASSIFICATION

RELATED APPLICATIONS

This application is a national phase of and claims priority to PCT/GB2014/052058, with an international filing date of Jul. 7, 2014, which in turn claims priority to GB 1312213.0, filed on Jul. 8, 2013, all of which are incorporated herein in their entirety.

BACKGROUND

Description of the Related Art

Recognition, detection and retrieval of objects in digital data, such as images, video, audio or other content is important in a broad range of applications, including management of multimedia content, information processing, visual search, pattern discovery, etc.

While the disclosed invention is general in nature, it is described with illustrative reference to search, recognition and classification of objects in images and videos.

Modern databases often contain billions of items, for example the number of images on www is approaching 100 billion. Consequently the speed and accuracy of the search or recognition process is crucial. However, the objects to be recognised are often surrounded by background clutter, or partially occluded therefore necessitating the use of local descriptors. Additionally, image variations due to illumination and view-point changes, different imaging devices responses, and object appearance changes due to time require robust techniques that can cope with significant variability of local measurements.

In the illustrative example of search, recognition or classification of images and videos, prior art local descriptors such as SIFT [3], SURF [4] or other similar local descriptors can be used. While the use of local descriptors increases the robustness to variable background, clutter, partial occlusion and similar effects, it also dramatically increases computational complexity of the search, as local descriptors need to be individually compared and matched. For example to compare two images containing N1 and N2 local descriptors respectively, N1*N2 comparisons are necessary. As the typical number of local descriptors in the image ranges from few hundreds to few thousands this requires over million comparisons to check the similarity between just two images. Search in a large database of few billion items consequently requires prohibitive level of computational resources (CPU processor, memory, power). Several approaches to alleviate this problem have been proposed in the literature.

One common processing approach is to use bag-of-words (BoW) representation [2]. BoW defines "visual words" by grouping together local descriptors into a codebook usually obtained by K-means clustering. To form the BoW representation, a histogram of the number of descriptors assigned to each cluster is constructed, where each local descriptor is assigned to the closest centroid. The number of clusters is usually between 20 thousands and 1 million with the best performance achieved when 1M+ bins are used. Inverted file index is typically used for efficient comparison of such BoW representations. The main limitation of the BoW representation is that the efficiency of the search and the memory requirements become prohibitive for larger databases, e.g. when the database size exceeds 10 million images.

Another approach is to use image representation based on Fisher Kernels [5, 6, 7, 1]. This method assumes that samples of local descriptors are distributed according to a statistical parametric generative model, typically Gaussian Mixture Model (GMM) [5]. The model parameters, which for each component Gaussian include its mean, standard deviation and weight coefficient are trained off-line based on large number of descriptors. The drawback of this approach is that training of the generic GMM is difficult, especially in a highly dimensional space, and frequently results in sub-optimal solutions, due to the optimisation process being stuck in local minima. Secondly, even if the global minimum could be found, the local descriptors very rarely follow Gaussian models (even locally) thus impacting negatively on the overall performance. Finally, it may not be feasible to represent a probability distribution spanning a highly-dimensional feature space (e.g. 128D for the SIFT descriptor) with a limited mixture of local, parametric models.

Another prior art method referred to as Vector of Locally Aggregated Descriptors (VLAD)[9] builds an image representation by aggregating residual errors for descriptors grouped based on a locality criterion in the feature space. Similarly as in BOW, a codebook is first computed off-line using k-means algorithm and each local descriptor is assigned to its nearest visual word. The main idea of the VLAD descriptor is to accumulate, for each visual word, the differences between the vectors assigned to each cluster and the corresponding cluster centre. This sum characterizes the distribution of the vectors assigned to each cluster with respect to the corresponding cluster centre. The main drawback of the VLAD is its limited robustness to outliers as a single vector located far from the cluster centre can outweigh the overall contribution from other vectors assigned to that centre.

An experimental evaluation of the performance of the state-of-the art, including BOW, VLAD and Fisher Kernels are presented in [1] and summarized in the table below, referred to as BoW, VLAD and GMM-FK respectively. The performance achieved by an embodiment of the present invention, referred to as Robust Visual Descriptor (RVD) is also included. The results show the best performance reported for image descriptors expressed as 2048 dimensional vectors (performance reported in terms of the mean average precision [mAP] for the Holiday Dataset and the number of correctly retrieved images in top four positions (including the query) for the UKB database). It should be noted that the paper [1] is co-authored by the original developers of the VLAD and Fisher Kernels methods and is therefore reflecting the best performance achievable. The performance achieved by the Robust Visual Descriptor (RVD) demonstrates significant improvement over prior art.

| Method | Holidays Dataset [mAP] | UKB |
| --- | --- | --- |
| BoW | 45.2 | 2.95 |
| VLAD | 62.1 | 3.35 |
| GMM-FK | 62.6 | 3.35 |
| RVD | 69.7 | 3.52 |

SUMMARY OF THE INVENTION

The presented invention discloses a compact and robust visual descriptor (RVD) for large scale visual search, retrieval and classification.

In accordance with one aspect of the invention, local feature vectors are rank-assigned to multiple class centres, thus increasing the number of local vectors assigned to each centre resulting in a robust cluster-level representation.

In accordance with another aspect of the invention, extraction of the robust cluster-level component representation uses a robust function which ensures influence of each local descriptor on the cluster-level representation is comparable.

In accordance with yet another aspect of the invention, the cluster occupancy and rank are used to estimate reliability of the cluster level representations and said reliability is used to only retain clusters with high reliability from the image-level RVD descriptor or additionally for rate control of the produced RVD descriptors.

In accordance with yet another aspect of the invention the produced representation is additionally coarsely quantized, for example binarized or ternarised, to produce a compact descriptor for very efficient matching.

In accordance with yet another aspect of the invention a linear transformation is applied before coarse quantization to increase performance.

In accordance with yet another aspect of the invention a subset of bits of said coarsely quantized representation is selected based on separability criteria to reduce the size of the representation and improve performance. Same or different number of bits can be retained for each cluster. The number of bits selected can be used to control the rate-performance of the descriptor.

In one aspect, the invention provides a method of deriving a representation of an image, by processing signals corresponding to the image, comprising identifying a plurality of feature points in the image, deriving feature descriptors of feature points, and assigning feature descriptors to pre-defined centre points, wherein each feature descriptor is assigned to a plurality of centre points, the method further comprising, for each centre point, calculating the difference (that is, vector difference, which can be regarded as a residual vector or residual descriptor) between each feature descriptor assigned to said centre point, deriving a value descriptor for each centre point from said calculated differences, and deriving the representation from said value descriptors for said centre points.

Other aspects of the invention are set out in the accompanying claims.

A method and apparatus for deriving a compact and robust representation of the content of images or video frames is described. The method involves processing signals corresponding to the image to extract local descriptors of the objects present in image or video frames content. The local descriptors are assigned to pre-computed clusters and ranked based on a locality criterion in the transformed feature space. A robust representation of each cluster is then derived based on the neighborhood rank information and direction-preserving robust mapping function, which limits the influence of outliers on the representation. The image or frame-level signature is then formed by concatenating selected cluster-based representations. In one embodiment, a mask function defines which clusters are selected, based on rank-weighted cluster occupancy. In another embodiment an independent mask function specifies which dimensions are used in the representation based on cluster class-separability. A coarsely quantized representation of the signature may be derived for example by applying binarization techniques to the signature vector producing even more compact representation and enabling very fast matching.

BRIEF DESCRIPTION OF THE DRAWINGS

Having described the invention in general terms, references will now be made to the accompanying drawings, which are not necessarily drawn to scale, and wherein.

DETAILED DESCRIPTION

Various embodiments for deriving a compact and robust representation of the content of images or video frames and for its use for the purpose of, for example, retrieval, recognition and classification are described below. For sake of simplicity in the description the term image will be used to mean images, video frames, visual objects or other similar representations or data.

The present invention is particularly useful for, but is not restricted to large scale visual search, image retrieval, image or visual object classification, etc.

Figure 2:
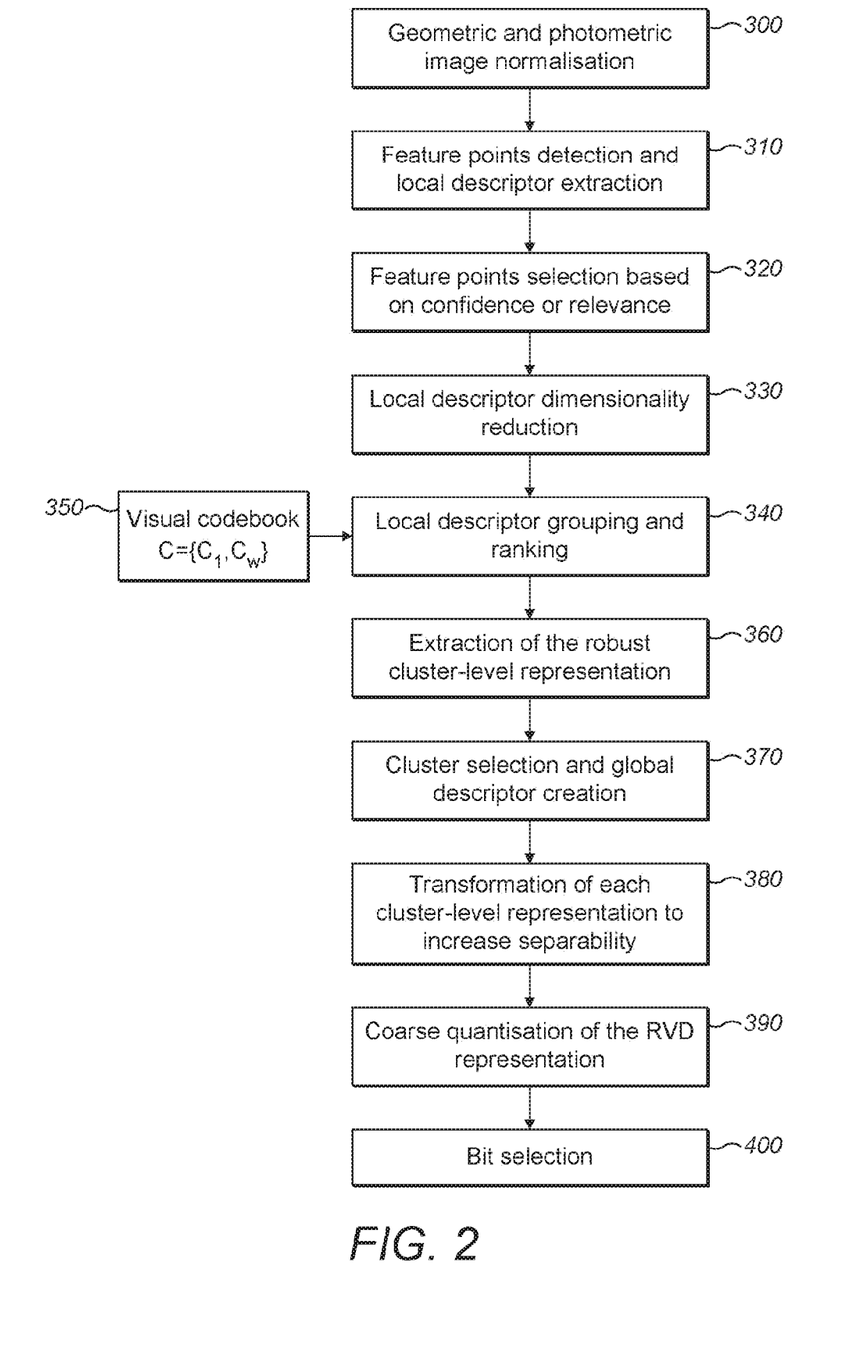
FIG. 2 illustrates a block diagram of a method for extraction of the RVD according to an example embodiment of the present invention.

In the initial stage of descriptor extraction, the image or video frames may be optionally pre-processed (block 300) by pre-filtering and normalized in size, for example the largest dimension of the image may be resized to 1024 pixels. Other photometric adjustments, such as contrast normalisation may be also applied.

In the next stage feature points are detected and described (block 310) using one of the prior art methods [8]. For example in one preferred embodiment the Hessian rotation- and affine-invariant region detector [8] is used to detect feature points which are described by the well-known SIFT descriptor [3]. A simplified feature point detector as originally proposed by Lowe [3] forms an alternative preferred embodiment with lower complexity at the expense of some performance deterioration.

For some applications, it may be desirable that only local descriptors with high confidence are used and for other applications it may be desirable that a fixed number of high-quality local descriptors are used. In the subsequent optional stage (block 320) the local descriptors are filtered based on a confidence or relevance measure computed for each feature point. The confidence or relevance measure depends on the type of descriptor employed. For example, for the SIFT detector and descriptor the confidence measure may be based on one or more of the following factors:

the scale σ, of the local feature,
the orientation θ, of the local feature,
the output level of the multi-scale filter at the local feature, for example Difference-of-Gaussians (DoG) or Laplacian-of-Gaussian (LoG) response,
the spatial location of the local feature within the image, for example by privileging descriptors located closer to the image centre.

Broadly speaking, the local feature confidence or relevance measure estimates the robustness or the stability of a local feature and reflects likelihood of the feature matching successfully. Any subsequent descriptor extraction or encoding step, will use a subset of the detected local features with the highest values of the confidence or relevance measure. In the preferred embodiment a subset of M=300 local features is selected from all local features detected, based on the product of probability values associated with each of the confidence factors listed above.

In the next stage (block 330), the dimensionality reduction of the local feature vectors is optionally performed, in order to reduce computational and memory complexity and also to improve the performance. For example, the principal component analysis (PCA) method, linear discriminant analysis (LDA) or other suitable method can be used at this stage. The optimal method will depend on the type of local feature descriptor and its dimensionality, and the memory and complexity constraints imposed by the user application. In one preferred embodiment employing SIFT local descriptors, a PCA is used to reduce the original 128 dimensional to 64 or 32 dimensions. In another preferred embodiment an LDA transformation is used to reduce the 128 dimensional SIFT to 64 dimensions. The LDA and PCA parameters are usually extracted off-line based on a large set of local feature descriptors extracted from representative visual content. For training of the LDA, two sets of matching and non-matching pairs of descriptors are required. While local descriptor dimensionality reduction is usually beneficial to overall performance and complexity, it is not essential and therefore it is optional.

The subsequent stage of the RVD descriptor extraction is local descriptor grouping and ranking based on the locality criterion in the transformed feature space F' (block 340).

To perform grouping a codebook of W visual words is computed off-line and stored (block 350), using for example k-means or hierarchical k-means algorithms. Other alternative suitable algorithms can also be used to derive the visual codebook. The codebook is a set of W points in F' dimensional space:

$$C = \{C_1, \ldots C_w\}$$

It should be noted the RVD technique is not very sensitive to visual words selection thanks to the robust aggregation as explained below.

The dimensionality of the codebook is selected to provide a good trade-off between the performance, extraction and matching complexity and memory use. In the preferred embodiments W=128, W=170 or W=256 were used. In general, selection of larger W produces larger RVD descriptors and requires more memory and computational resources, however generally produces better results.

For each local feature descriptor $ld_i$ (where $i \in \{ \ldots \}$ denotes the local feature descriptor index), the distances to all cluster centres, or centre points, $C_j$ (where $j \in \{1, 2, \ldots W\}$ denotes cluster index) are computed and ranked in increasing distance order based on the distances from the cluster centres. The distance measures used include L1 and L2 or other suitable distances, with L1 distance used in the preferred embodiment due to its lower computational complexity. Each local feature $ld_i$ is assigned to the KN nearest class centres. This rank-based multiple assignment of local features increases probability that many clusters have sizeable population of local descriptors assigned to them by effectively re-using local descriptors with multiple class centres. The selection of a good KN depends on the image resolution, number of class centres, type and reliability of the local descriptors employed and the density of local descriptors in the image. In the preferred embodiment KN=3 is used.

Figure 3A:
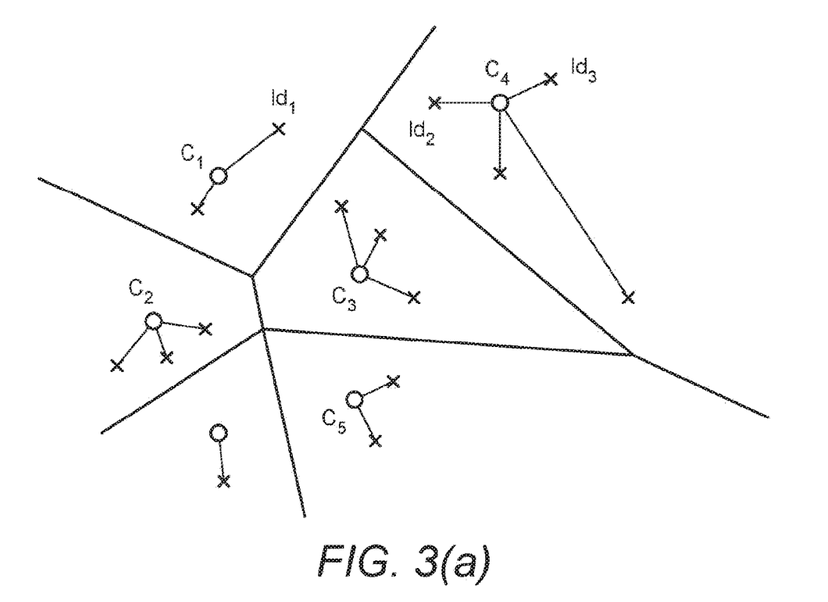
FIGS. 3a-3b illustrate segmentation of local feature vectors according using hard assignment according to prior art (a), and using rank-based assignment according to an example embodiment of the present invention (b)
Figure 3B:
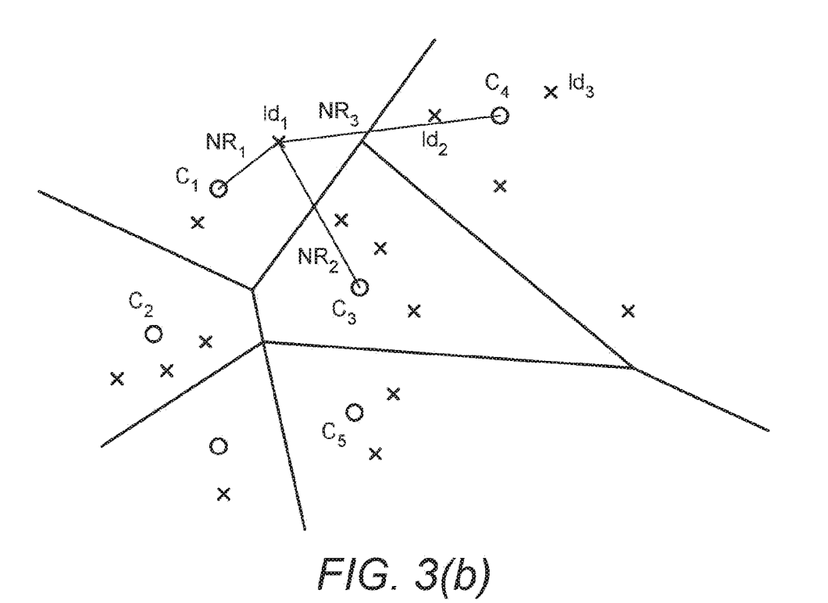

FIG. 3(a) shows typical nearest neighbour assignment used in the BoW and VLAD approaches (also referred to as hard-assignment) and FIG. 3(b) shows rank-based assignment with KN=3. It can be seen that for the rank-based assignment the local descriptor $ld_i$ is assigned to class centres $C_1$, $C_3$ and $C_4$ with ranks 1 ($NR_1$—Neighborhood rank 1), 2 ($NR_2$—Neighborhood rank 2), and 3 ($NR_a$), respectively. Note that unlike in the soft assignment case, all descriptors are assigned with the same weight to relevant clusters with rank below or equal to KN, independently from the actual distance from the respective class centres. In the soft assignment case, descriptors are assigned to multiple class centres with fractional weights, for example with weights related to distance ($1/r^2$) or determined by a probability distribution.

Figure 4A:
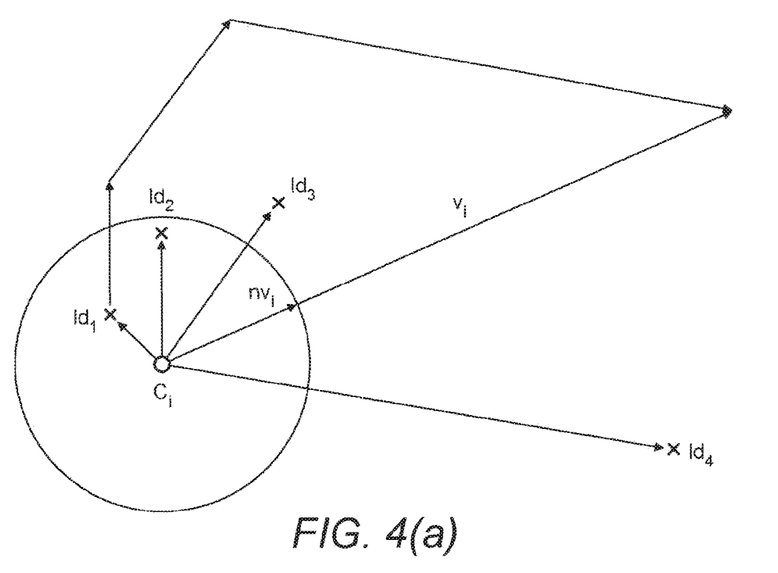
FIGS. 4a-4b illustrate the aggregation of local descriptors according to prior art—VLAD (a), and generation of the robust vectors representation of the local feature vectors at the cluster level according to an example embodiment of the present invention (b)

A robust representation of the local vectors assigned to each cluster (group) is extracted in block 360. The process is illustrated with reference to FIG. 4. FIG. 4(a) shows a typical prior-art approach, such as VLAD. Each local descriptor $ld_i$ is associated to its nearest visual word $C_i$ and difference vectors $ld_i - C_i$ (also referred to as residual errors) are summed up for each cluster independently:

$$v_i = \sum_{All\ ld_j\ assigned\ to\ C_i} ld_j - C_i$$

Each of vectors $v_i$ is subsequently L2 normalized after aggregation of all residual errors resulting from the assigned vectors ($\|v_i\|$ denotes a norm of the vector $v_i$, for example L1 norm).

$$nv_i = \frac{v_i}{\|v_i\|}$$

Figure 4B:
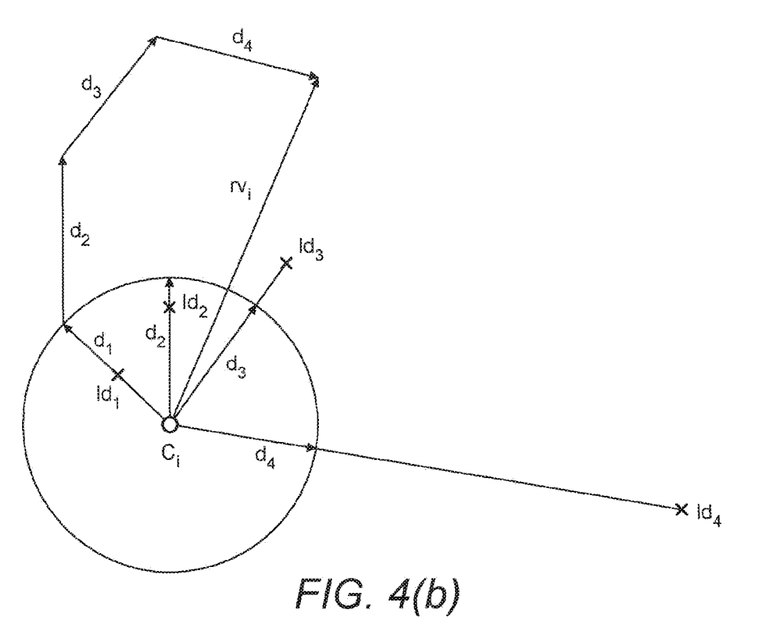

In contrast to prior art, the invention provides for a novel and robust aggregation of local descriptors, illustrated in FIG. 4(b). For each cluster $C_i$ and each associated local descriptor dj with the neighborhood rank k, the residual errors $ld_i - C_i$ are computed and subsequently transformed by a robust vector function $\psi(ld_j - C_i)$ to produce value descriptors, indicated as $d_j$ in FIG. 4(b). Thus $dj = \psi - C_i$). After transformation the resulting values $d_i$ are aggregated preferably for each neighborhood rank separately and then preferably combined across all neighborhood ranks. The rank level combination preferably includes weights $w_k$ reflecting the fact that typically the number of local descriptors increases as the neighborhood rank increases. In the preferred embodiment neighborhood rank 3 is used (KN=3) and the weight values are $w_1 = 4$, $w_2 = 2$, $w_a = 1$.

$$rv_i = \sum_{k=1}^{KN} w_k \sum_{\text{All } ld_j \text{ belinging to rank } k \text{ neighborhood of } C_i} \psi(ld_j - C_i)$$

The robust functions and rank-based weighting are contemplated to limit the impact of outliers (or local descriptors that are far away from the class centre $C_j i$ and are designed such that the influence of a single local descriptor on the aggregated representative value $rv_i$ value is limited and similar for all local descriptors. At the stage of descriptor extraction it is not known which local descriptors will be outliers for a particular pair of images and all local descriptors have the same apriori probability of being outliers, it is therefore a good strategy to ensure that each local descriptor has the same ability to influence the robustly aggregated value. As a specific example, a robust function transforms residual descriptors so that their direction is maintained, but their length or value is the same, for example, unit length.

Examples of robust functions include the Huber function [10], and can be approximated by L1 or L2 normalisation functions (with some loss of efficiency). The preferred embodiment is using L1 normalisation for the simplicity of implementation. FIG. 4 illustrates the result of aggregation with prior art (vector $nv_i$ in FIG. 4(a)) and based on the proposed invention (vector $rv_i$ in FIG. 4(b)), showing that the results are very different. In particular, local feature vector $ld_4$ has a very significant influence on the aggregated vector $nv_i$, due to its large residual value. In robust aggregation, the influence of each of the four local descriptors $ld_1$, $ld_2$, $ld_3$, $ld_4$ is equalized by the use of robust function (L2 normalisation in the illustrative case shown in FIG. 4b). Furthermore, it should be noted that in prior art aggregated vector $nv_i$ is of unit length it thus does not reflect the number of contributing local vectors. Conversely, amplitude of vector $rv_i$ computed according to the invention reflects the number of local descriptors contributing and the direction consistency of corresponding transformed residual descriptors. In the embodiment, the robust function transforms the residual descriptors to unit length, and preserves their direction, so that the aggregation of the local descriptors reflects the number of local descriptors, and reflects overall, combined, direction of transformed residual descriptors. The robustly aggregated vector $rv_i$ according to the present invention will be referred to as cluster-level component RVD vector or value descriptor.

The reliability of each cluster-level component RVD descriptor extracted for each cluster is computed in block 370 and used to select reliable cluster for the overall representation. As appreciated by the skilled in the art there are many ways to estimate reliability, for example based on the number of local descriptors used or consistency of their representation. In the preferred embodiment, the reliability factor $rf_i$ is computed based on the number of local descriptors associated with a given cluster at each rank of neighborhood as follows:

$$rf_i = \sum_{k=1}^{KN} rw_k * nk_i$$

where $nk_i$ is the number of local feature vectors assigned to cluster i☐ with the neighborhood rank level k and $rw_k$ are weights associated with particular ranks of neighborhood. In the preferred embodiment the following weights are used: $rw_1=4$, $rw_2=2$, $rw_a=1$. While these are the same as $w_k$ in this description, this may not generally be the case.

It is generally beneficial to reject clusters with low level of occupancy, retaining only a subset of s clusters with most reliable cluster-level component RVD. Clusters with low level of occupancy can be more affected by the outliers and are therefore less reliable. In the preferred embodiment a threshold of 4 was applied—all clusters with the lower reliability factor (rf<4) were rejected (i.e. not used in forming of the image level RVD descriptor). However, sometimes it may be desirable to use higher level of the threshold, depending on the required size of the image-level descriptor and the target performance. In another preferred embodiment a variable threshold was used to obtain a scalable bitstream. In this embodiment a threshold of 13 reduced the size of the descriptors generated by 50%.

Figure 5:
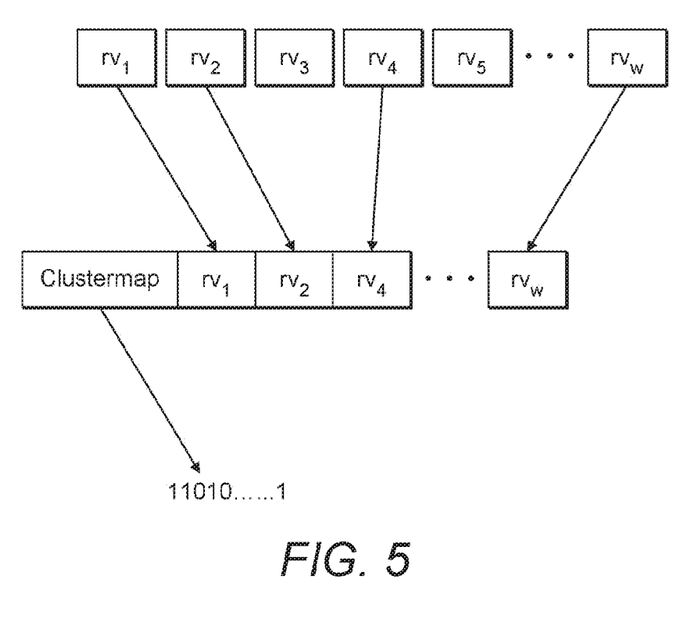
FIG. 5 illustrates combination of cluster-level RVD component descriptors into image-level RVD representation with cluster selection according to an example embodiment of the present invention.

The selected sk cluster-level component RVD vectors $rv_i$ from the previous step can be combined into a k*s dimensional vector RVD representation of the image in block 370 by concatenation of the selected clusters. A k binary flags are used to indicate which clusters are present to enable cluster-to-cluster matching of the representations (FIG. 5).

Optionally, clusters-level representations can be transformed via a linear transformation (such as PCA, LDA or similar, computed offline) and the only component dimensions associated with high energy or high class separability are selected to increase compactness and performance. This is performed in the module 380.

Figure 6:
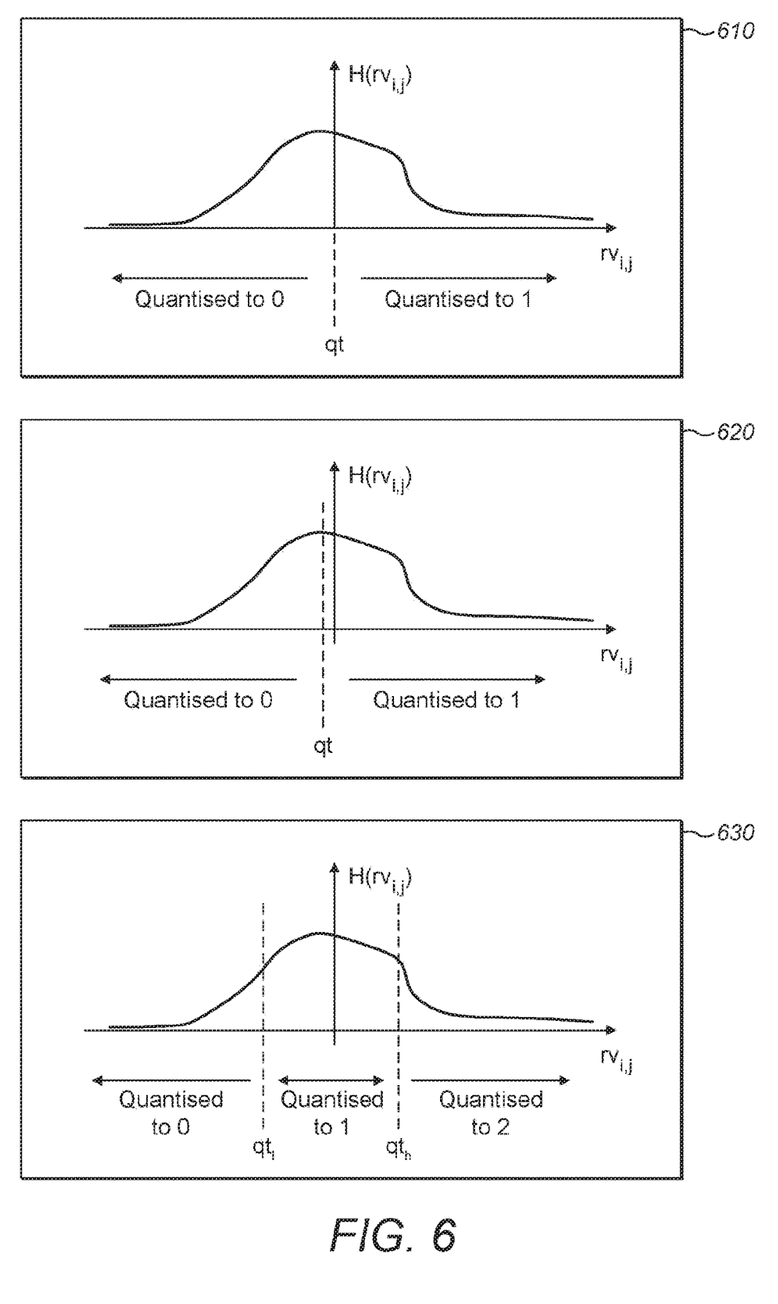
FIG. 6 shows the process of coarse quantization of the RVD descriptor components according to an example embodiment of the present invention.

For some applications it is desirable to generate and use coarsely quantized version of the descriptor, in particular a binary descriptor, due to the resulting compactness and high matching speed. The representation computed in blocks 370 or 380 can be easily coarsely quantized (block 390). For example each component of the RVD vector can be converted into a binary representation by means of thresholding with a threshold qt (FIG. 6, block 620) or by simply using the sign of the original vector component value, which is equivalent to setting qt=0 (FIG. 6, block 610). For example, binary value "1" is assigned to vector components greater than the threshold qt☐ and binary value "0" to components smaller than the threshold, or vice versa. Another possibility is to use a ternary quantization, where each vector component is converted to one of three values (for example 0, 1 and 2 or other values suitable for the implementation), based on the histogram of occurrences (distribution) of the particular vector component that is converted (FIG. 6, block 630). Typically the conversion is based on two thresholds $qt_l$ and $qt_h$, for example selected such that the probability of each quantized value is equal. Other scalar or vector quantization schemes are also possible, as known to the skilled in the art. The preferred embodiment includes binarization based on sign of the component, as it minimises the memory use and simplifies the conversion. Another preferred embodiment uses binarization with a threshold that equalizes the probability of bits being "0" and "1".

In accordance with yet another aspect of the invention, to achieve even more compact representation a subset of elements of the said binary or ternary representation is selected based on separability criteria in block 400. Same or different number of coarsely quantized elements can be retained for each cluster. One preferred embodiment uses binary quantization and different bits are selected for each cluster to maximise each cluster separability measure.

Figure 1:
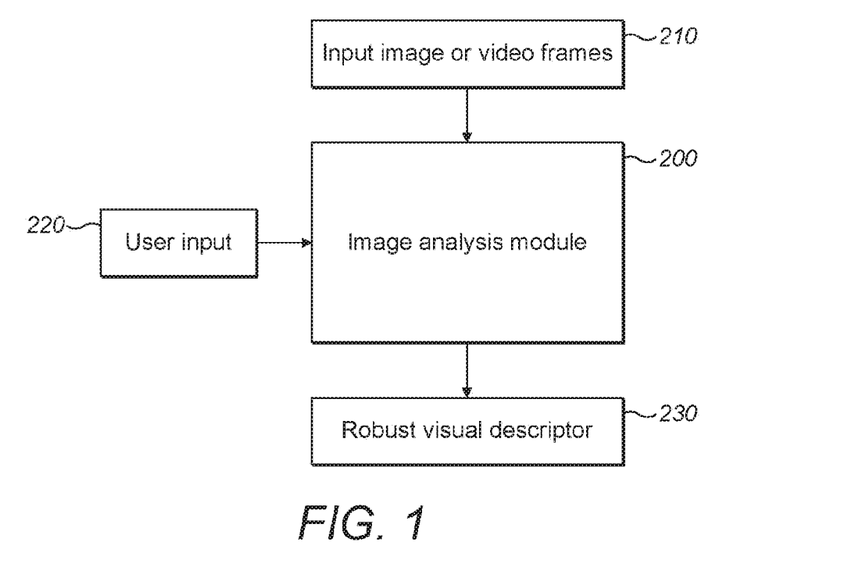
FIG. 1 illustrates a block diagram of an apparatus for visual search, recognition and retrieval with Robust Visual Descriptor according to an example embodiment of the present invention.

FIG. 1 shows an apparatus according to an embodiment for executing the methods as set out above. The apparatus includes an image analysis module 200 and a user input 220.

Images of video frames 210 are input to the image analysis module 200, and a robust visual descriptor 230 is output.

The user input 220 (for example, mouse, keyboard etc) can be used, for example, to select images or parts of images, to be processed.

The apparatus can be implemented using hardware and/or software elements. For example, the apparatus can be implemented by a suitably programmed computer system, operating on input images. For example, the apparatus may include at least one input for inputting an image or images, a processor, for processing image data, or signals corresponding to images, and an output for outputting an image descriptor or descriptors. The apparatus may also includes storage mediums, for example, for storing images and descriptors. Alternatively, the apparatus may be in the form of one or more application-specific modules.

REFERENCES

[1] H. Jegou, F. Perronnin, M. Douze, J. Sanchez, P. Perez, and C. Schmid, "Aggregating Local Image Descriptors into Compact Codes", IEEE Transactions on Pattern Analysis and Machine Intelligence, September 2012, Volume: 34, Issue: 9, pp: 1704-1716

[2] J. Sivic and A. Zisserman, "Video Google: A text retrieval approach to object matching in videos", in ICCV, October 2003, pp: 1470-1477

[3] D. Lowe, "Distinctive image features from scale invariant keypoints", International Journal of Computer Vision, vol. 60, no. 2, pp. 91-110, 2004.

[4] H. Bay, A. Ess, T. Tuytelaars, L. Van Gool, "SURF: Speeded Up Robust Features", Computer Vision and Image Understanding (CVIU), Vol. 110, No. 3, pp. 346-359, 2008

[5] T. Jaakkola and D. Haussler, "Exploiting generative models in discriminative classifiers, in NIPS 1998

[6] F. Perronnin, C. R. Dance, "Fisher Kernels on visual vocabularies for image categorization", in CVPR, June 2007.

[7] U.S. Pat. No. 7,885,794, "Object comparison, retrieval and categorization methods and apparatuses", Yan Liu and Florent Perronnin, Filed 30 Nov. 1997.

[8] K. Mikolajczyk, T. Tuytelaars, C. Schmid, A. Zisserman, J. Matas, F. Schaffalitzky, T. Kadir, and L. V. Gool, "A comparison of affine region detectors," International Journal of Computer Vision, vol. 65, no. 1/2, pp. 43-72, 2005.

[9] H. Jegou, M. Douze, C Schmid, P. Perez "Aggregating local descriptors into a compact image representation", IEEE Conference on Computer Vision & Pattern Recognition", June 2010, pp: 3304-3311

[10] P. Huber, "Robust Statistics", Wiley Series in Probability and Statistics, Ed. 2, ISBN-10: 0470129905

The invention claimed is:

1. A method of deriving a representation of an image, by processing signals corresponding to the image, comprising:
identifying a plurality of feature points in the image, deriving feature descriptors of the feature points, and assigning the feature descriptors to pre-defined centre points,
wherein each feature descriptor is assigned to a plurality of centre points,
the method further comprising, for each centre point, calculating a vector difference between each feature descriptor assigned to said centre point and said centre point, deriving a value descriptor for each centre point from said calculated vector differences, and deriving the representation of the image from said value descriptors for said centre points.

2. The method of claim 1, wherein each feature descriptor is assigned to a plurality of centre points with a same weight.

3. The method of claim 1, wherein deriving a value descriptor for each centre point from said calculated vector differences comprises transforming each calculated vector difference by a robust function.

4. The method of claim 3 wherein said robust function is such that the influence of each feature descriptor assigned to a centre point on the corresponding value descriptor is substantially equalized.

5. The method of claim 3, wherein said robust function is a normalisation function.

6. The method of claim 1 wherein deriving a value descriptor for each centre point from said calculated differences comprises summing said calculated vector differences or said transformed calculated vector differences.

7. The method of claim 1 wherein each feature descriptor is assigned to a predetermined number of centre points.

8. The method of claim 1 wherein each feature descriptor is assigned to the nearest centre points.

9. The method of claim 1 further comprising, for each feature descriptor assigned to a centre point, assigning an associated rank, indicating the order of proximity of the feature descriptor from said respective centre point.

10. The method of claim 9, wherein deriving a value descriptor for each centre point from said calculated differences comprises summing said distances or said transformed distances for each rank independently.

11. The method of claim 9, wherein deriving a value descriptor for each centre point from said calculated vector differences comprises transforming each calculated vector difference by a robust function and summing transformed calculated vector differences for each rank independently.

12. The method of claim 10, further comprising summing over ranks.

13. The method of claim 12, wherein weights are assigned to ranks, and used in the sum over ranks.

14. The method of claim 13, wherein higher ranks have higher weights.

15. The method of claim 12, comprising assigning a corresponding weight to each of the ranks and using said assigned weights to determine reliability.

16. The method of claim 1 comprising, for the value descriptor for each centre point, determining a factor indicating reliability of the value descriptor.

17. The method of claim 1, comprising selecting centre points, and/or associated value descriptors, based on the number of feature points assigned to said centre points and/or reliability factor.

18. The method of claim 1 comprising concatenating selected value descriptors to form a descriptor.

19. The method of claim 18 further comprising indicating the respective centre points, using binary flags.

20. The method of claim 1 further comprising performing coarse quantization on the elements of the value descriptors, preferably binary or ternary quantization.

21. The method of claim 1 comprising selecting a subset of elements for each value descriptor, optionally different subsets for different centre points.

22. A method of matching images, comprising deriving a value descriptor of each image using the method of claim 1 and comparing each of the value descriptors for corresponding centre points.

23. The method of claim 22 wherein deriving a value descriptor of each image comprises identifying a plurality of feature points in the image, deriving feature descriptors of feature points, and assigning feature descriptors to pre-defined centre points, and wherein each feature descriptor is assigned to a plurality of centre points.

24. Apparatus comprising an image processor for determining feature points in an image, and a processor for deriving an image representation by executing the steps of—
- identifying a plurality of feature points in the image, deriving feature descriptors of the feature points, and assigning the feature descriptors to pre-defined centre points,
- wherein each feature descriptor is assigned to a plurality of centre points;
- and for each centre point, calculating a vector difference between each feature descriptor assigned to said centre point and said centre point, deriving a value descriptor for each centre point from said calculated vector differences, and deriving the image representation from said value descriptors for said centre points.

25. A non-transitory computer-readable storage medium storing computer-executable instructions, arranged for causing a processor to perform the steps of—
- identifying a plurality of feature points in the image, deriving feature descriptors of the feature points, and assigning the feature descriptors to pre-defined centre points,
- wherein each feature descriptor is assigned to a plurality of centre points,
- the method further comprising, for each centre point, calculating a vector difference between each feature descriptor assigned to said centre point and said centre point, deriving a value descriptor for each centre point from said calculated vector differences, and deriving the representation from said value descriptors for said centre points.

* * * * *